United States Patent
Alshatwi et al.

(10) Patent No.: US 9,896,342 B1
(45) Date of Patent: Feb. 20, 2018

(54) **SYNTHESIS OF NANOSTRUCTURES FROM *PHOENIX DACTYLIFERA* AGRO-WASTES**

(71) Applicant: KING SAUD UNIVERSITY, Riyadh (SA)

(72) Inventors: Ali Abdullah Alshatwi, Riyadh (SA); Jegan Athinarayanan, Riyadh (SA); Periasamy Vaiyapuri Subbarayan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/717,604

(22) Filed: Sep. 27, 2017

(51) Int. Cl.
*C01B 32/18* (2017.01)
*D21C 1/06* (2006.01)
(Continued)

(52) U.S. Cl.
CPC ............ *C01B 32/18* (2017.08); *D21C 1/06* (2013.01); *D21C 3/04* (2013.01); *D21C 9/02* (2013.01); *D21C 9/14* (2013.01); *D21H 11/14* (2013.01); *B82Y 30/00* (2013.01); *B82Y 40/00* (2013.01); *C01P 2002/84* (2013.01); *C01P 2004/04* (2013.01); *C01P 2004/64* (2013.01); *Y10S 977/762* (2013.01); *Y10S 977/774* (2013.01); *Y10S 977/795* (2013.01); *Y10S 977/896* (2013.01)

(58) Field of Classification Search
CPC .. C01B 32/18; D21C 1/06; D21C 3/04; D21C 9/02; D21C 9/14; D21H 11/14; B82Y 40/00; C01P 2002/84; C01P 2004/04; C01P 2004/64; Y10S 977/762; Y10S 977/774; Y10S 977/795; Y10S 977/896
See application file for complete search history.

(56) References Cited

U.S. PATENT DOCUMENTS

| 8,796,362 B2 | 8/2014 | Meldal et al. |
| 2015/0004415 A1* | 1/2015 | Biswal ............... C09C 1/48 428/402 |

FOREIGN PATENT DOCUMENTS

DE 24 59 226 A1 6/1976

OTHER PUBLICATIONS

Bhardwaj, et al., Carbon Material from Natural Sources as an Anode in Lithium Secondary Battery, Carbon Letters 2007; 8(4): 285-291.*
(Continued)

*Primary Examiner* — Daniel C McCracken
(74) *Attorney, Agent, or Firm* — Richard C. Litman

(57) ABSTRACT

A method of synthesizing nanostructures from agro-waste can include providing powdered *Phoenix dactylifera* agro-waste; mixing the powdered *Phoenix dactylifera* agro-waste with a liquid to provide a *Phoenix dactylifera* agro-waste solution; heating the *Phoenix dactylifera* agro-waste solution in a hydrothermal autoclave to provide a heated solution; and centrifuging the heated solution to provide a liquid fraction and a solid fraction. The liquid fraction can include a first plurality of nanostructures. The first plurality of nanostructures can include C-dots. The solid fraction can be further processed to provide a second plurality of nanostructures and a third plurality of nanostructures. The second plurality of nanostructures can include lignin nanoparticles. The third plurality of nanostructures can include cellulose nanocrystals. The nanostructures can be used in various applications, such as three dimensional cell culture, UV-protecting textiles, and bio-imaging.

12 Claims, 7 Drawing Sheets

(51) Int. Cl.
    D21C 9/14     (2006.01)
    D21C 9/02     (2006.01)
    D21C 3/04     (2006.01)
    D21H 11/14    (2006.01)
    B82Y 40/00    (2011.01)
    B82Y 30/00    (2011.01)

(56) References Cited

OTHER PUBLICATIONS

Alshatwi, A. A., Athinarayanan, J., & Periasamy, V. S. (2015). Materials Science and Engineering: C, 47, 8-16.

Anwar, Z., Gulfraz, M. and Irshad, M., 2014. Agro-industrial lignocellulosic biomass a key to unlock the future bio-energy: a brief review. Journal of radiation research and applied sciences, 7(2), pp. 163-173.

Awasthi, K., Kumar, R., Tiwari, R. S., & Srivastava, O. N. (2010). Journal of Experimental Nanoscience, 5(6), 498-508.

Bendahou, A., Habibi, Y., Kaddami, H. and Dufresne, A., "Physico-Chemical Characterization of Palm from Phoenix dactylifera-L, Preparation of Cellulose Whiskers and Natural Rubber-Based Nanocomposites," Journal of Biobased Materials and Bioenergy, 3(1):81-90, Mar. 2009.

Kalia, S, Dufresne, A., Cherian, B., Kaith, B.S., Avérous, L., Njuguna, J., and Nassiopoulos, E., "Cellulose-Based Bio- and Nanocomposites: A Review," International Journal of Polymer Science, vol. 2011, 35 pages.

Madurwar, M.V., Ralegaonkar, R.V. and Mandavgane, S.A., 2013. Application of agro-waste for sustainable construction materials: A review. Construction and Building Materials, 38, pp. 872-878.

Saini, J.K., Saini, R. and Tewari, L., 2015. Lignocellulosic agriculture wastes as biomass feedstocks for second-generation bioethanol production: concepts and recent developments. 3 Biotech, 5(4), pp. 337-353.

\* cited by examiner

SYNTHESIS OF NANOSTRUCTURES FROM *PHOENIX DACTYLIFERA* AGRO-WASTES

TECHNICAL FIELD

The present subject matter relates to nanostructure synthesis from agricultural or farming waste, otherwise known as agro-waste, and particularly to synthesis of nanostructures from *Phoenix dactylifera* agro-wastes.

BACKGROUND

The date palm tree (*Phoenix dactylifera* L.) is an economically important plant in Arab countries, particularly the Gulf countries. The Gulf countries produce approximately 50% of dates worldwide, according to the UN Food & Agriculture Organization (FAO). The Kingdom of Saudi Arabia (KSA) is a major date producer. More than 25 million date palm trees grow on 157,000 hectares and produce around 1.1 million tons per year of date fruits, according to the Ministry of Agriculture.

Each date palm tree generates around 40 kg of dried, burnable agro-waste annually, which includes sheaths, dried leaves, petioles, and spathes. The dried agro-waste materials are not suitable for animal feed and only a small amount of the agro-waste finds use in limited traditional applications, such as shading, house construction, crates, handicrafts, landfilling, and panel boards. As such, a huge amount of date palm agro-waste is not utilized and instead creates an environmental nuisance. Therefore, it is desirable to find a use for agro-waste, particularly through new techniques and products.

Nanostructured materials (NMs) can be useful in electrical, optical, catalytic, and biological applications. NMs exhibit shape, size, surface area, chemical composition, and aggregation state based on their physical, chemical, and biological properties and can differ entirely from bulk materials with the same composition. Moreover, NMs can improve product quality, efficiency, stability, and function in various sectors, including textiles, food, agriculture, information technology, electronics, energy, and medicine. NMs have particular promise as a versatile toolbox for biomedical applications, such as antimicrobial agents, contrast agents in bio-imaging, scaffolds for tissue engineering and 3D-cell culture, disease diagnosis and therapy, and as drug and gene carriers.

SUMMARY

A method of synthesizing nanostructures from agro-waste can include providing powdered *Phoenix dactylifera* agro-waste; mixing the powdered *Phoenix dactylifera* agro-waste with a liquid to provide a *Phoenix dactylifera* agro-waste solution; heating the *Phoenix dactylifera* agro-waste solution in a hydrothermal autoclave to provide a heated solution; and centrifuging the heated solution to provide a liquid fraction and a solid fraction. The liquid fraction can include a first plurality of nanostructures. The first plurality of nanostructures can include C-dots. The solid fraction can be further processed to provide a second plurality of nanostructures and a third plurality of nanostructures. The second plurality of nanostructures can include lignin nanoparticles. The third plurality of nanostructures can include cellulose nanocrystals. The nanostructures can be used in various applications, such as three dimensional cell culture, UV-protecting textiles, and bio-imaging.

These and other features of the present subject matter will become readily apparent upon further review of the following specification and drawings.

BRIEF DESCRIPTION OF THE DRAWINGS

Similar reference characters denote corresponding features consistently throughout the drawings.

DETAILED DESCRIPTION

Figure 1:
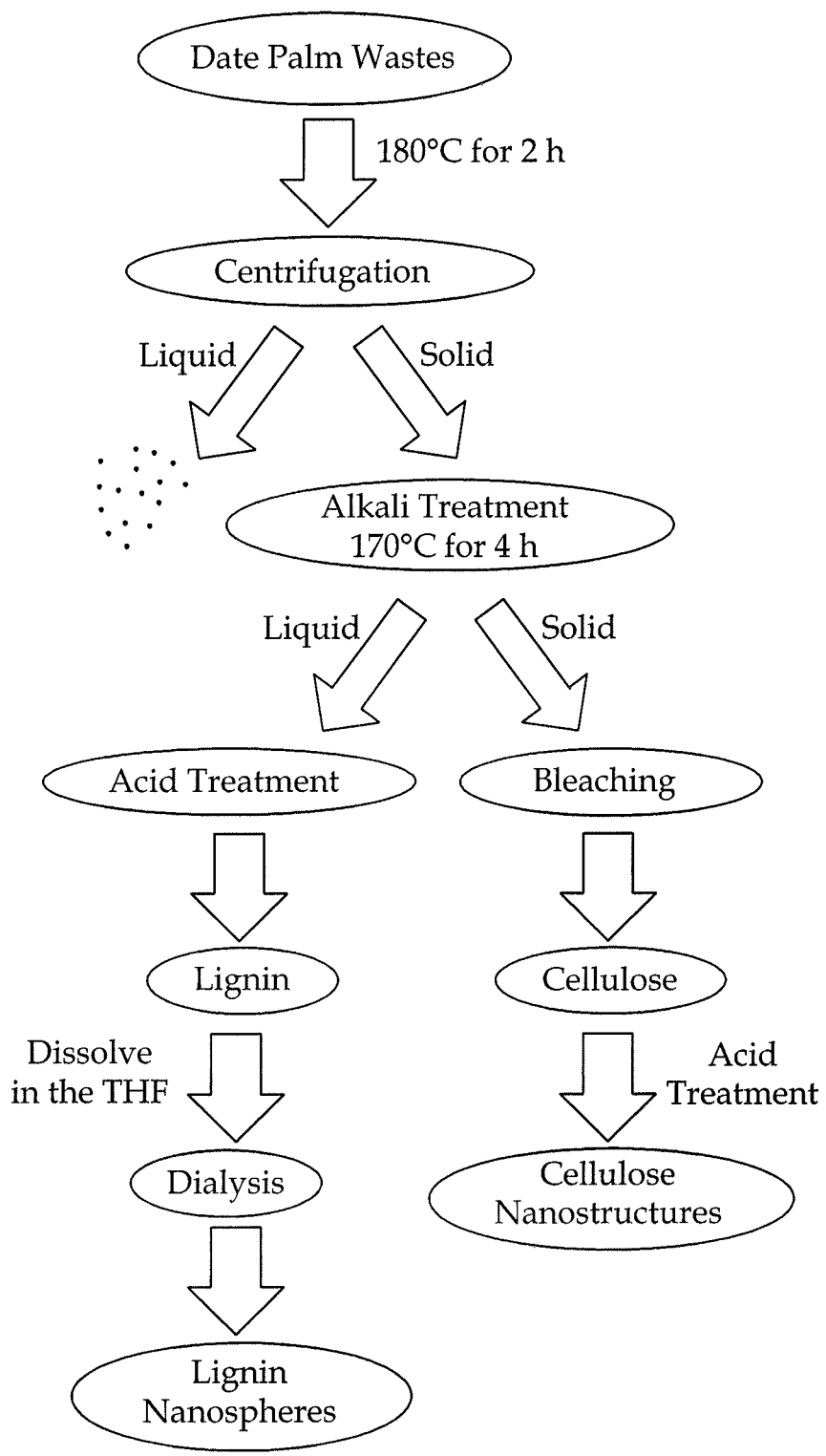
FIG. 1 shows a schematic representation of a method of nanostructure synthesis from date palm agro-waste.

FIG. 1 is a schematic representation of an exemplary method for synthesis of nanostructures according to the present teachings. The process includes sanitizing and pre-treating date palm wastes or biomass to provide a dried, powdered biomass. The powdered biomass can be mixed with distilled water and heated in an autoclave, e.g., at a temperature of about 180° C. for about two hours, to provide a heated solution. The heated solution can be centrifuged to provide a solid fraction and a liquid supernatant including C-dots. The C-dots can be separated from the liquid supernatant, e.g., by dialysis. The C-dots can be about 2 nm to about 30 nm in size, e.g., about 2 nm to about 10 nm or about 5 nm to about 30 nm.

The solid fraction can be mixed with a base and heated in an autoclave, e.g, at a temperature of about 170° C. for about four hours, to provide an alkali treated solution and an alkali treated solid. The alkali treated solution can be further treated to provide lignin nanospheres. For example, the alkali treated solution can be treated with acid to form lignin materials which are then dissolved in THF solvent to provide a solution including lignin nanospheres. The nanospheres can be isolated from the solution, e.g., by dialysis. The lignin nanospheres can range from about 100 nm to about 900 nm in diameter. The alkali treated solid can be bleached prior to acid treatment to provide cellulose nanostructures. The cellulose nanostructures can have a width of about 5 nm to about 10 nm and a length of about 400 nm to about 700 nm.

The biocompatibility of the synthesized nanostructures was analyzed using human mesenchymal stem cells as an in vitro model. The prepared nanostructures (C-dots, cellulose nanofibrils, and lignin nanoparticles) did not cause any significant changes in cell viability and cellular and nuclear morphology of human mesenchymal stem cells up to a 200 µg/mL concentration.

Generally, plant biomass includes hemicellulose, lignin, and cellulose, among other components. However, the composition of plant biomass varies from one plant to another plant. The date tree biomass has high concentrations of cellulose (39-47%) and lignin (32-35%) and a lower concentration of hemicellulose (15-25%). Interestingly, a date palm leaflet includes 41-43% cellulose and 32-36% lignin. Moreover, a date palm leaf stalk includes 44-47% cellulose and 33-38% lignin. Compared with other parts of date palm, the leaflet and leaf stalk-based waste generation is very high and has high cellulose and lignin content. Thus, date palm biomass is highly suitable for synthesis of cellulose, lignin, and carbon-based nanostructures.

The following examples illustrate the present teachings.

EXAMPLES

Example 1

Synthesis of Nanostructures

Date palm plant biomass was collected from a date farm in Riyadh (Saudi Arabia). The obtained plant biomass chemical composition was analyzed using previously described methods (TAPPI T 203 CM-99, T 222 CM-88, and T 211 CM-93 methods).

The collected plant biomass was washed with distilled water to eliminate the unwanted dust materials and fine sands. The washed plant biomass was dried and powdered. 25 g per batch of plant biomass powder was mixed with 500 ml distilled water and kept in a hydrothermal autoclave at 180° C. for 2 hours. After hydrothermal reaction, the obtained product was centrifuged at 20,000 rpm for 30 minutes. The supernatant (liquid fraction) was separated and filtered using a 0.2 µm pore size sterile filter. The obtained solution was dialyzed using a dialysis bag. After dialysis, the obtained solution was freeze dried and used for further characterization. Remaining residues (solid fraction) were used for lignin and cellulose nanofibrils synthesis.

The obtained solid residues were mixed with 5% sodium hydroxide and kept in a hydrothermal autoclave at 170° C. for 4 hours. The obtained products were filtered using a Whatman 1 filter paper. The solid fraction was used for cellulose nanofibrils fabrication. The liquid fraction was used for lignin nanoparticles preparation. The liquid fraction pH was adjusted to pH 2 using diluted hydrochloric acid for lignin materials precipitation. The obtained precipitate was washed with distilled water. After washing, the lignin was dissolved in THF solvent and dialyzed to provide lignin nanoparticles.

For cellulose nanofibril synthesis, the remaining solid fraction of the previous step was bleached at 95° C. for 90 minutes using bleaching solution [1:1 solution of acetate buffer (27 g NaOH and 75 ml acetic acid in 1 L water) and 1.7% sodium hypochlorite]. After bleaching, the obtained residue was washed until pH was neutral. The obtained white colored cellulose material was dried at 60° C. The cellulose was treated with 45% sulphuric acid at 45° C. for 25 minutes under stirring. Subsequently, the mixer was kept in −80° C. for 1 hour. After incubation, the product was washed with distilled water using centrifugation. The obtained residue was sonicated for 10 minutes and dialyzed. The finally obtained colloid was freeze dried for further physico chemical characterization.

Example 2

Physico-Chemical Properties of the Nanostructures

Figure 2A:
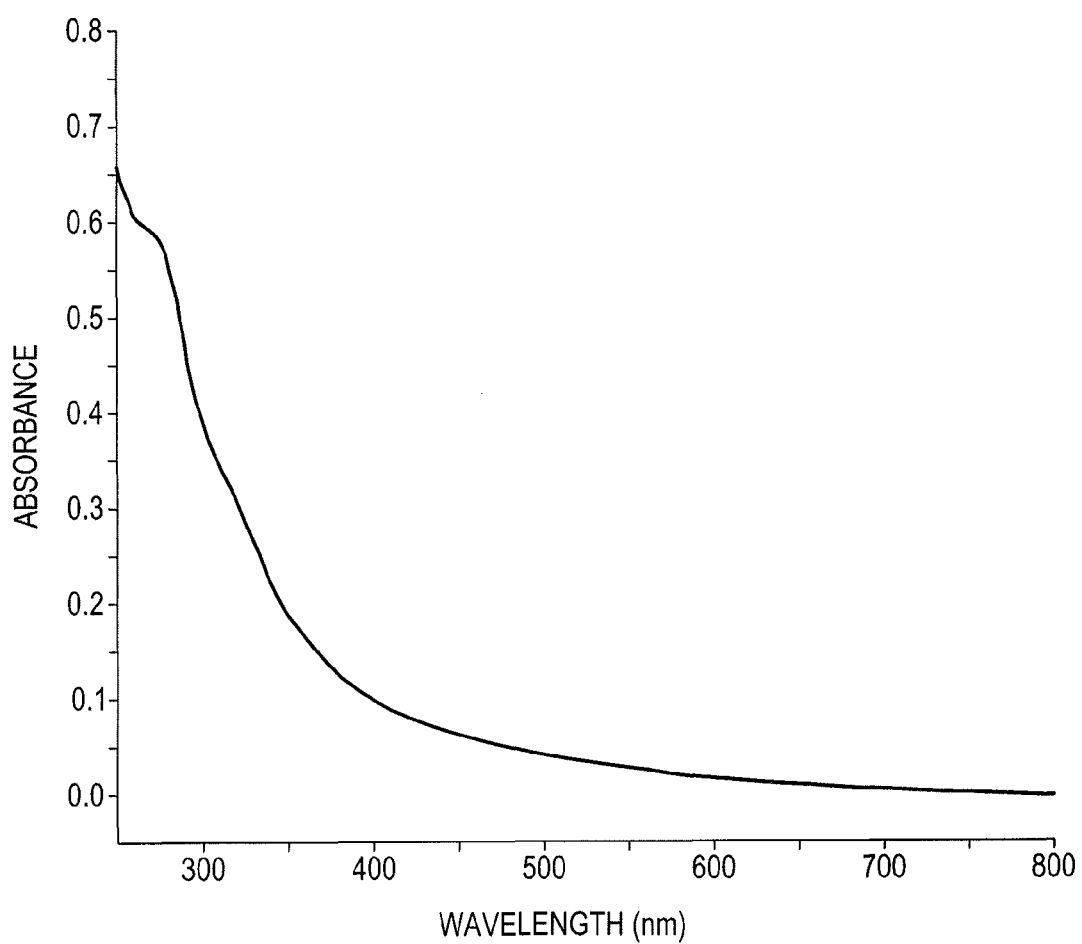
FIG. 2A shows UV-vis spectra of fabricated C-dots.
Figure 2B:
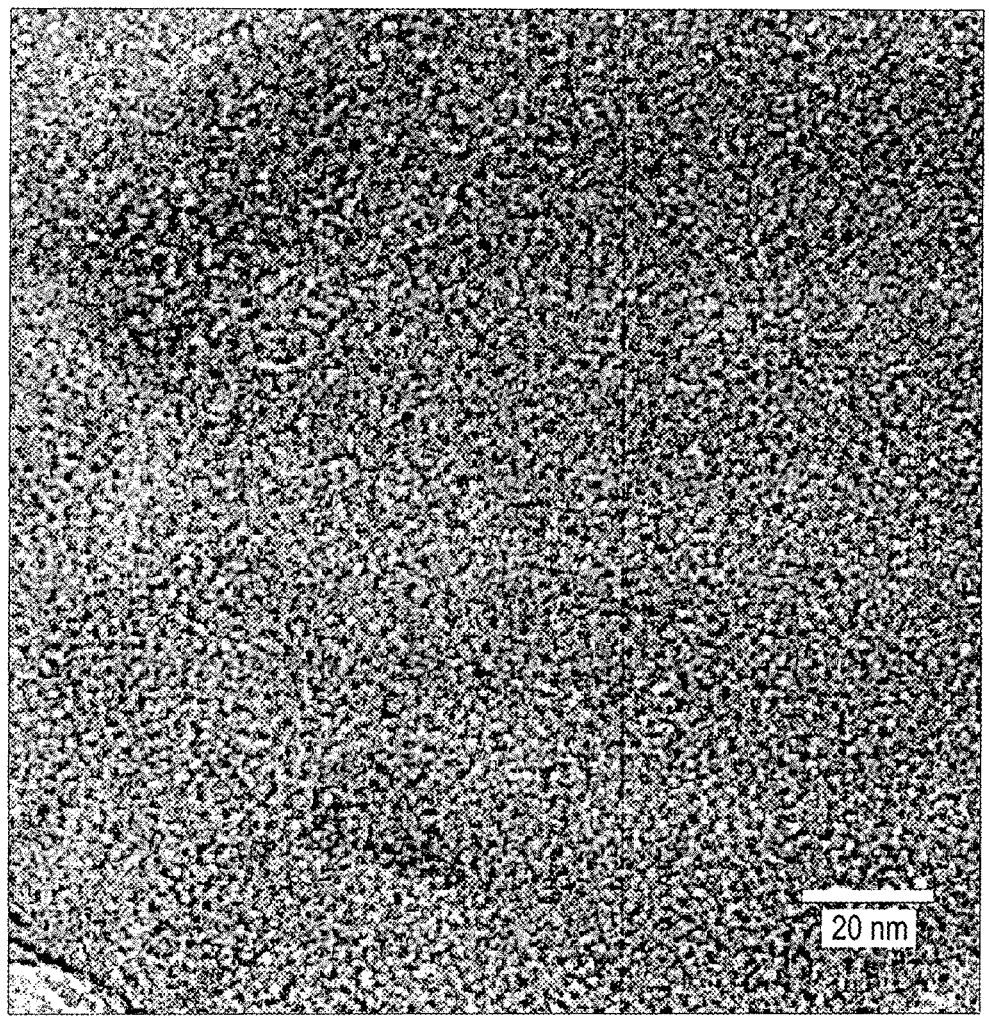
FIG. 2B shows a TEM (transmission electron microscopy) image of fabricated C-dots.
Figure 2C:
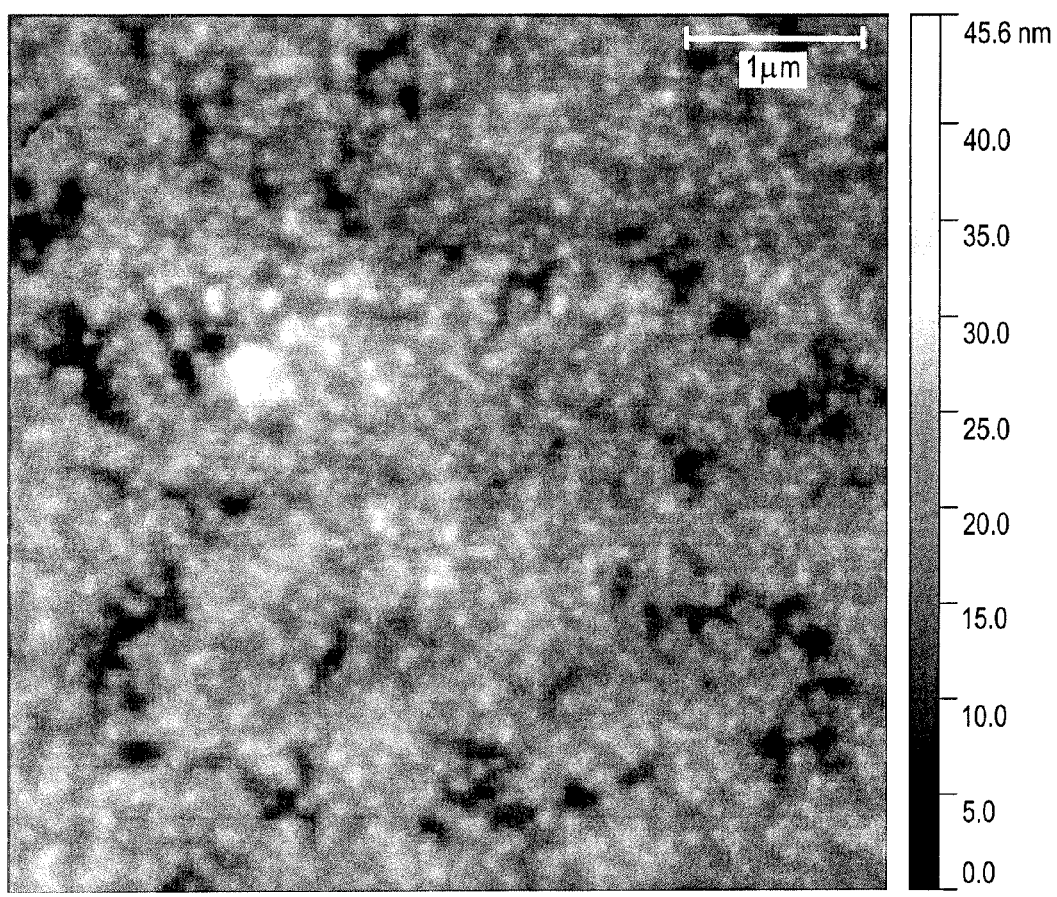
FIG. 2C shows an AFM (atomic force microscope) image of fabricated C-dots.

The prepared C-dots solution displayed light yellow color in daylight and exhibited blue color under florescent UV light (FIG. 2A). The UV-Vis spectroscopy analysis results show the peak at 280 nm, due to the $\pi$-$\pi$* transition of the C=O bond, which indicates the presence of aromatic $\pi$ orbitals in the prepared C-dots. The TEM image shows 2-10 nm spherical dots (FIG. 2B). The AFM images suggested that the particle size of C-dots is 5-30 nm (FIG. 2C).

Figure 3A:
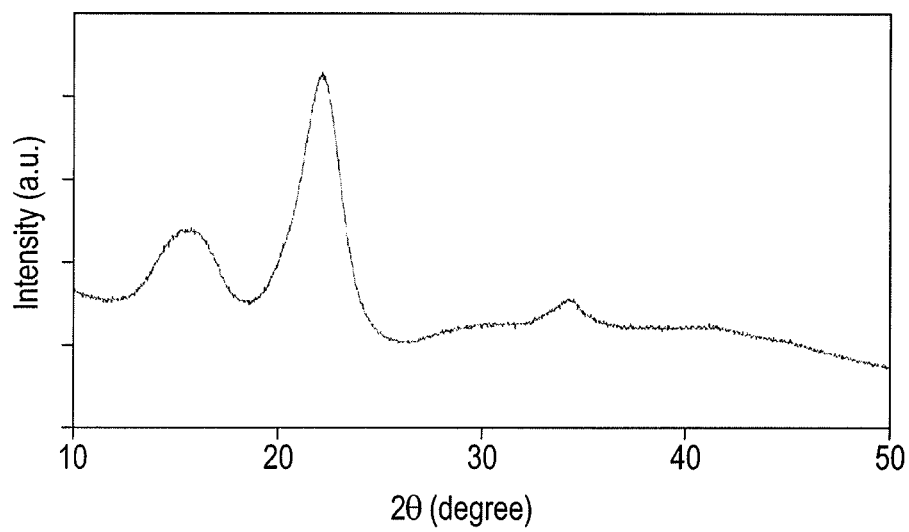
FIG. 3A shows the synthesized nanofibrillated cellulose in an XRD (x-ray diffraction) pattern.
Figure 3B:
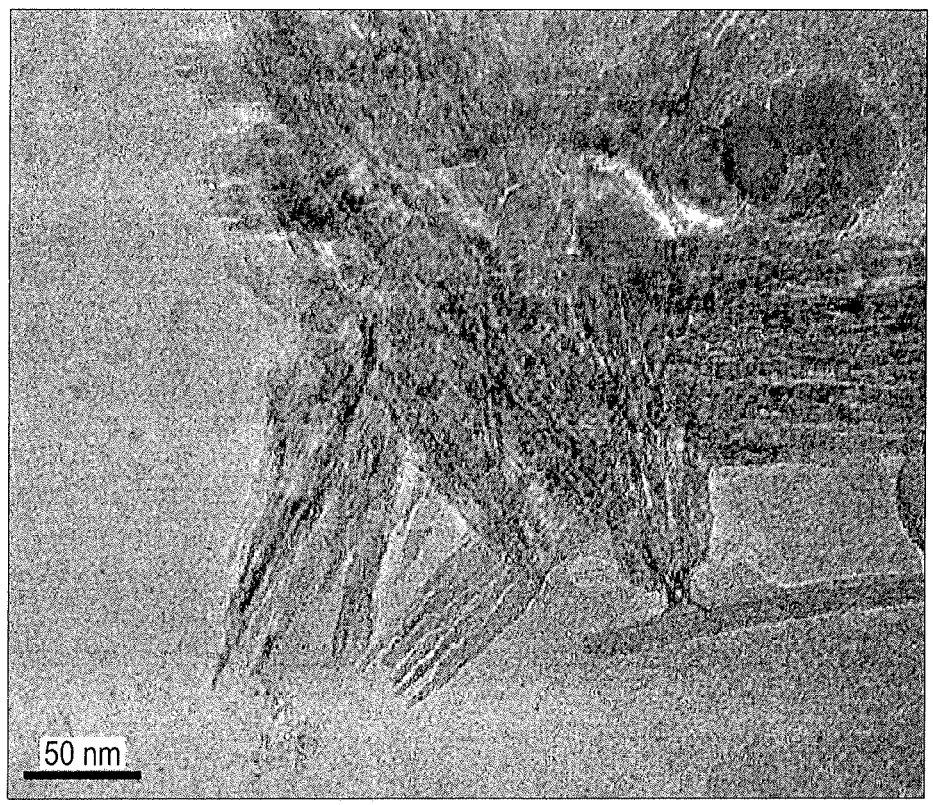
FIG. 3B and FIG. 3C show the synthesized nanofibrillated cellulose in TEM images.
Figure 3C:
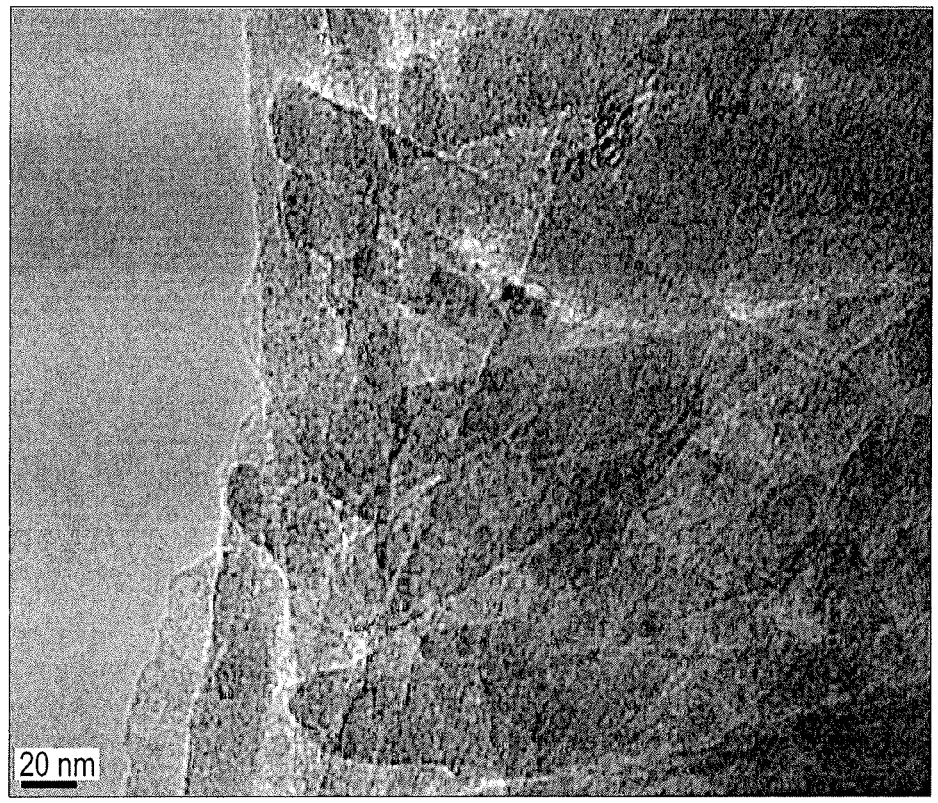

The crystallinity of the fabricated cellulose nanostructures was analyzed using an X-ray diffractometer. The XRD results exhibited two peaks at $2\theta=14.9°$ and $21.98°$, which corresponds to the (101) and (002) planes of cellulose I structure (FIG. 3A). The structure and morphological features of nanofibrillated cellulose were investigated using a transmission electron microscope (FIGS. 3B-C). The fabricated cellulose nanostructure has a fibrillated structure with a 5-10 nm width and 400-700 nm length. The nanofibrils display an interconnected netting arrangement and can be highly suitable for biomedical applications.

Figure 4A:
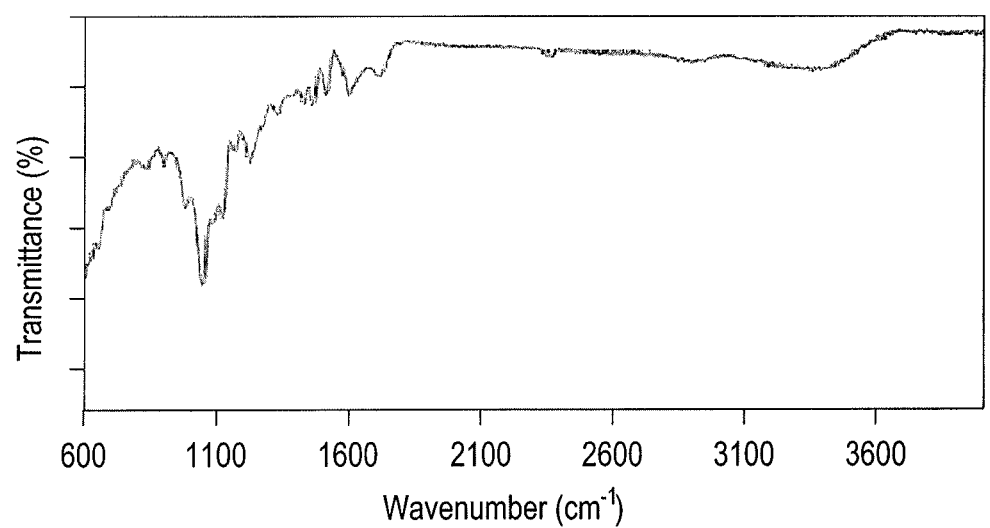
FIG. 4A shows FT-IR (Fourier transform infrared spectroscopy) spectra of lignin nanoparticles from date palm waste.

The extracted lignin was dissolved in tetrahydrofuran and dialyzed. After dialysis, the obtained lignin physicochemical properties were analyzed. FIG. 4A shows the FT-IR spectra of synthesized lignin nanoparticles. Hydroxyl groups of aliphatic and phenolic structure are responsible for the peak between 3400 $cm^{-1}$ and 3600 $cm^{-1}$. Interestingly, many peaks were observed between 800 $cm^{-1}$ and 1700 $cm^{-1}$. The peak at 901 $cm^{-1}$ corresponds to an alkyl substituted alkene. The peaks observed at 1054, 1093, 1121, 1170, 1227, and 1333 correspond to the stretching mode of C—O—C. The stretching mode of the C=C corresponding peak was observed at 1615 $cm^{-1}$, which indicates groups associated with the aromatic ring. The stretching mode of aromatic C—C is responsible for the peaks observed at 1500 to 1552 $cm^{-1}$. In addition, the peaks corresponding to the bending scissoring mode of $CH_2$ were observed at 1443 $cm^{-1}$. As such, the FT-IR spectra peaks are characteristic of lignin.

Figure 4B:
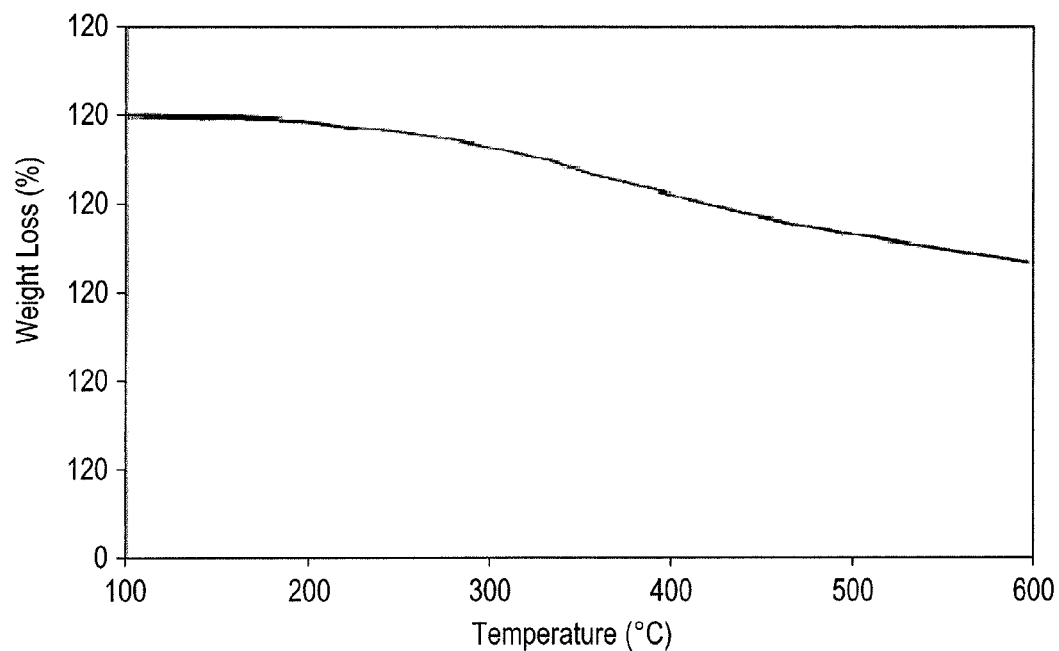
FIG. 4B shows thermogravimetric analysis curves of lignin nanoparticles from date palm waste.
Figure 4C:
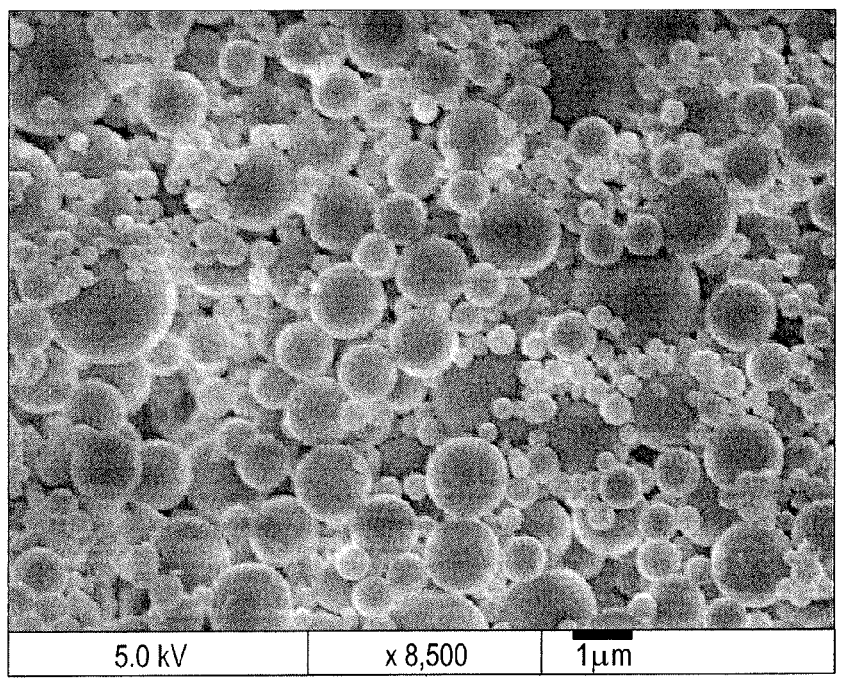
FIG. 4C shows SEM (scanning electron microscopy) images of lignin nanoparticles from date palm waste.

Lignin is an organic material composed of mostly aromatic rings with various branching. Around 60-70% of lignin nanoparticles are un-volatized at 600° C., due to the formation of highly condensed aromatic structures which have the ability to form char. Moreover, the lignin nanoparticles degradation is divided into three stages shown in FIG. 4B. In the initial stage, water molecules are evaporated at 100-120° C. In the second stage, the carbohydrates in lignin nanoparticles are degraded at around 175-325° C. The third stage is degradation of volatile products from lignin nanoparticles. Thus, when the temperature is increased, the degradation process is initiated and the structure is then broken. The synthesized lignin nanoparticles are highly stable. The morphology of the lignin nanoparticles was investigated using FE-SEM. The images show the lignin nanoparticles size varied from 100-900 nm in diameter and that the particles are spherical shape (FIG. 4C).

Results indicate that the C-dots, cellulose nanofibrils, and lignin nanoparticles from date palm waste were successfully synthesized through the integrated process described herein. Thus, the present method can be applicable for large scale production of the nanostructures and to valorize the agro-wastes. This process may further be applicable for all plant biomass to nanostructures fabrication.

Example 3

Assessment of Biocompatibility of Nanostructures

Biocompatibility is an important and essential property for biologically applied materials. In this aspect, the cytotoxic properties of prepared C-dots, lignin nanoparticles, and cellulose nanofibrils were assessed using human mesenchymal stem cells as an in vitro model.

Ten thousand cells per well was plated in 96-well plates and kept at 37° C. for 24 hours. After incubation, the cells were treated with different concentrations (0, 12.5, 25, 50, 100, and 200 µg/mL) of synthesized nanostructures for 24 hours and 48 hours. After treatment, 20 µL of 3-(4,5-Dimethylthiazol-2-yl)-2,5-diphenyltetrazolium bromide solution was added per well and incubated in the dark for 4 hours at 37° C. Subsequently, the obtained purple color formazan crystals were dissolved by 100 µL of DMSO per well, and the plates were read in a microplate reader (Bio-Rad, CA, USA) at 570 nm. Data was collected in triplicate for each concentration of materials, and the data was used to calculate the mean. The percent of cell viability was calculated from the data.

The cells were seeded in 6-well plates and pre-treated with different concentrations (0, 50, and 100 µg/mL) of prepared nanostructures for 24 and 48 hours. After incubation, cellular morphology was observed under a bright field microscope. For nuclear morphology analysis, cells were treated with acridine orange/ethidium bromide and observed under a fluorescence microscope.

The prepared nanostructures (C-dots, cellulose nanofibrils, and lignin nanoparticles) did not cause any significant changes in cell viability and cellular and nuclear morphology of human mesenchymal stem cells up to a 200 µg/mL concentration. The biocompatibility assay results suggested that nanostructures are non-toxic, and thus may be applicable for various biomedical applications, such as scaffolding of three dimensional cell culture, bio-imaging, cancer therapy, and antioxidants.

It is to be understood that the present subject matter is not limited to the embodiments described above, but encompasses any and all embodiments within the scope of the following claims.

We claim:

1. A method of synthesizing nanostructures from agro-waste comprising:
    providing powdered *Phoenix dactylifera* agro-waste;
    mixing the powdered *Phoenix dactylifera* agro-waste with a liquid to provide a *Phoenix dactylifera* agro-waste solution;
    heating the *Phoenix dactylifera* agro-waste solution in a hydrothermal autoclave to provide a heated solution; and
    centrifuging the heated solution to provide a liquid fraction and a solid fraction, the liquid fraction including a first plurality of nanostructures, the first plurality of nanostructures including C-dots.

2. The method of claim 1, wherein the liquid comprises water and the *Phoenix dactylifera* agro-waste solution is kept in hydrothermal autoclave at about 180 C for about two hours.

3. The method of claim 1, further comprising:
    mixing the solid fraction with a base to provide a basic solution;
    heating the basic solution in an autoclave to provide a heated basic solution;
    filtering the heated basic solution to obtain a filtered solid fraction and a filtered liquid fraction;
    adjusting a pH of the filtered liquid fraction to provide a precipitate;
    washing the precipitate;
    dissolving the precipitate in a solvent; and
    dialyzing the solvent to provide a second plurality of nanostructures, the second plurality of nanostructures including lignin nanoparticles.

4. The method of claim 3, wherein the base is 5% sodium hydroxide.

5. The method of claim 3, wherein pH is adjusted to 2 using diluted hydrochloric acid.

6. The method of claim 3, wherein the precipitate is washed with distilled water.

7. The method of claim 3, wherein the solvent is THF solution.

8. The method of claim 3, further comprising:
    bleaching the filtered solid fraction using a bleaching solution to obtain a residue;
    washing the residue to provide a pH neutral residue;
    mixing the pH neutral residue with an acid under stirring to provide a mixture;
    cooling the mixture to provide an incubated product;
    centrifuging the incubated product to provide a centrifuged residue;
    sonicating the centrifuged residue to provide a product including a third plurality of nanostructures, the third plurality of nanostructures including cellulose nanofibrils.

9. The method of claim 8, wherein the bleaching occurs at 95° C. for 90 minutes and wherein the bleaching solution is a 1:1 solution of 1.7% sodium hypochlorite and acetate buffer.

10. The method of claim 8, wherein the mixing includes mixing with 45% sulfuric acid at 45° C. for 25 minutes.

11. The method of claim 8, wherein the cooling occurs at a temperature of about −80° C. for about 1 hour.

12. The method of claim 8, wherein the sonicating occurs for 10 minutes.

* * * * *